US008976429B2

(12) United States Patent
Kani

(10) Patent No.: US 8,976,429 B2
(45) Date of Patent: Mar. 10, 2015

(54) IMAGE READING DEVICE, IMAGE READING SYSTEM, AND METHOD FOR SCANNING IN LOGGED-OUT STATE

(75) Inventor: Mamoru Kani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 215 days.

(21) Appl. No.: 13/531,686

(22) Filed: Jun. 25, 2012

(65) Prior Publication Data

US 2013/0003148 A1 Jan. 3, 2013

(30) Foreign Application Priority Data

Jun. 28, 2011 (JP) ................................. 2011-143150

(51) Int. Cl.
*H04N 1/46* (2006.01)
*H04N 1/21* (2006.01)
*H04N 1/44* (2006.01)
*H04N 1/00* (2006.01)

(52) U.S. Cl.
CPC .......... *H04N 1/2166* (2013.01); *H04N 1/00474* (2013.01); *H04N 1/00482* (2013.01); *H04N 1/4413* (2013.01); *H04N 1/4433* (2013.01); *H04N 2201/0081* (2013.01); *H04N 2201/0087* (2013.01)
USPC ............................ 358/505; 358/474; 358/451

(58) Field of Classification Search
CPC .......... H04N 1/00474; H04N 1/00482; H04N 1/2166; H04N 1/4413
USPC .......................................... 358/505, 474, 451
See application file for complete search history.

(56) References Cited

U.S. PATENT DOCUMENTS

| | | | | |
|---|---|---|---|---|
| 5,548,390 | A * | 8/1996 | Sugisaki et al. | 399/364 |
| 6,462,837 | B1 * | 10/2002 | Tone | 358/3.01 |
| 2002/0080420 | A1 * | 6/2002 | Yokochi | 358/471 |
| 2006/0256392 | A1 | 11/2006 | Van Hoof et al. | |
| 2007/0076238 | A1 * | 4/2007 | Odagiri | 358/1.14 |
| 2007/0147929 | A1 | 6/2007 | Ishimoto et al. | |
| 2009/0021761 | A1 * | 1/2009 | Suzuki et al. | 358/1.13 |
| 2009/0064320 | A1 | 3/2009 | Okamoto et al. | |
| 2010/0007928 | A1 | 1/2010 | Kashioka | |
| 2011/0261386 | A1 * | 10/2011 | Kasuya | 358/1.14 |

FOREIGN PATENT DOCUMENTS

| | | | |
|---|---|---|---|
| CN | 1984225 | A | 6/2007 |
| CN | 101176337 | A | 5/2008 |
| CN | 101335820 | A | 12/2008 |

(Continued)

*Primary Examiner* — Martin Mushambo
(74) *Attorney, Agent, or Firm* — Morgan, Lewis & Bockius LLP

(57) ABSTRACT

A image reading device comprises a reading part for reading a document, a storage part including shared space, and an operation part for accepting input of identification information when the device is in a logged-out state, entering a logged-in state when a user is successfully certified, accepting settings input and function execution input when the logged-in state is in effect, and entering the logged-out state when predetermined conditions are met, the operation part including a scanning START key for accepting instructions to perform scanning using the reading part. When the scanning START key is pressed while the device is in the logged-out state, the reading part reads a document and forms image data, and the storage part stores the image data formed by logged-out scanning in the shared space.

11 Claims, 9 Drawing Sheets

(56) References Cited

FOREIGN PATENT DOCUMENTS

| | | |
|---|---|---|
| JP | 2000-324275 A | 11/2000 |
| JP | 2006-060740 A | 3/2006 |
| JP | 2011-037161 A | 2/2011 |

* cited by examiner

IMAGE READING DEVICE, IMAGE READING SYSTEM, AND METHOD FOR SCANNING IN LOGGED-OUT STATE

This application is based upon and claims the benefit of priority from the corresponding Japanese Patent Application 2011-143150, filed on Jun. 28, 2011, the entire contents of which are incorporated herein by reference.

BACKGROUND OF THE DISCLOSURE

1. Field of the Disclosure

The present disclosure relates to an image reading device, such as a multifunctional peripheral, copying machine, or fax device, having a certification function and including a reading part for reading a document; and to an image reading system including an image reading device and an information processing device.

2. Description of Related Art

An image reading device may also be provided in an image forming device such as a multifunctional peripheral, a copying machine, a FAX device, or the like. Image data obtained by using the image reading device to scan the document is used for printing, transmission of image data to a computer or the like, accumulation of image data on an HDD, and the like. In particular, because a multifunctional peripheral has multiple functions, there are cases in which a plurality of settings must be set even when performing scanning, and scanning cannot be easily performed. Thus, an information processing device as described below is known.

Specifically, there is known an information processing device for remotely setting scan and transmission settings of an image input device whose scan and transmission settings can be remotely registered, the information processing device having associating means for associating existing text data with the image input device, extracting means for extracting scan settings from the text data associated with the image input device, setting means for setting the location at which the text data is saved within storage means as the save location for scan data, and means for transmitting the extracted scan settings and set save location to the image input device as scan and transmission settings to be registered in the image input device. Such a configuration seeks to allow for an application running on a client computer to be operated, and for the scan data save location and scan settings to be registered in the image input device through a simple operation.

An image reading device, such as a multifunctional peripheral, has an operation panel. There exist image reading devices wherein user certification (user designation) is performed with the goal of preventing unauthorized use by third parties or collecting usage data for each user. For example, when certification is performed, a user inputs into the operation panel a user name, user ID, password, or other identification information for identifying the user. When part of pre-programmed certification information matches the identification information inputted to the operation panel, the image reading device determines the user to have been certified, and enters a logged-in state. In the logged-in state, the operation panel accepts settings and job executions. In other words, when not logged in, a user cannot, for example, set scan settings or issue scan execution instructions.

When the device is in the logged-in state, a user sets settings for performing scanning as desired. For example, a user sets the locations for storing and transmitting (addresses) image data obtained by scanning, the scanning resolution, the reading color settings, and the like.

In this way, scanning can be performed using an image reading device, such as a multifunctional peripheral, that performs user certification only after various inputs have been performed on the operation panel. However, a somewhat lengthy period of time is need to perform the inputs for logging in and scan settings, forcing other users who wish to use the image reading device to wait. Furthermore, there exists a display part (for example, an LCD panel) mounted on the operation panel that displays a preview image of the scan execution results. The displaying of this preview image is useful in confirming the correctness of the settings, but is a factor lengthening the time from beginning to set scan settings to inputting begin execution instructions.

For this reason, in existing devices, many inputs are necessary during the time from beginning log-in inputs to issuing instructions to begin scan execution, and, when the time needed to confirm the preview image is included, the waiting time for users waiting their turns is increased. For this reason, the problem of reduced image reading device utilization rates and office productivity arises.

By configuring the information processing device so that scan data save location and scan settings can be registered in the information processing device in advance, it is possible to shorten the amount of time needed to set scan settings in an image reading device such as a multifunctional peripheral. However, when the image reading device is used, it is necessary to perform log-in inputs (inputs for certification) and inputs calling up the registered settings upon the operation panel. For this reason, while scan settings are simplified, time is still needed in order to perform scanning. When there are errors in the registered settings, or when one wishes to make additions or changes to the settings, one must either once more set the settings of the information processing device, or else set settings in the image reading device. At times, one may also confirm the preview image. In this way, resetting settings or confirming the preview image may lengthen the waiting times of users waiting their turns. Thus, the problem of reduced image reading device utilization rate and office productivity remains in such an information processing device, and the problems described above cannot be resolved.

SUMMARY OF THE DISCLOSURE

The present disclosure was contrived in light of the problems with the prior art described above, and dramatically reduces the amount of time needed until beginning scanning execution in a logged-out state, improves the image reading device utilization rate, and increases office productivity by enabling easy scanning even in a logged-out state.

In order to resolve the problems described above, the image reading device according to a first aspect of the present disclosure including an operation part for accepting input of identification information for identifying and certifying a user in a logged-out state, entering a logged-in state when the user is successfully certified, accepting a settings input and a function execution input entered in order to use a function of the image reading device in the logged-in state, and entering the logged-out state when a predetermined condition is met, the operation part including a scanning START key for accepting an instruction to begin performing scanning; a reading part for reading a document, forming image data, and performing logged-out scanning, in which a document is read and image data is formed when the scanning START key is pressed while the image reading device is in the logged-out state; and a storage part including a shared space constituting a shared storage space, the storage part adapted for storing, in the shared space, image data formed by the logged-out scanning Scanning can thus be easily performed even in a logged-out state. The amount of time needed to perform scanning (time from beginning log-in input to issuing scan execution instructions after setting various settings) can be dramatically reduced. An image reading device which improves utilization rates and increases office productivity can thus be provided.

Further features and advantages of the present disclosure will become apparent from the description of embodiments given below.

DETAILED DESCRIPTION OF PREFERRED EMBODIMENTS

There follows a description of an embodiment of the present disclosure with reference to FIGS. 1 through 12. The following description will feature a multifunctional peripheral 100 as an example of an image reading device. In other words, the multifunctional peripheral 100 is equivalent to an image reading device. However, the various elements of the embodiment, such as the configuration, arrangement, and the like, are merely for the sake of illustration, and in no way limit the scope of the disclosure.

(Outline of Multifunctional Peripheral 100)

Figure 1:
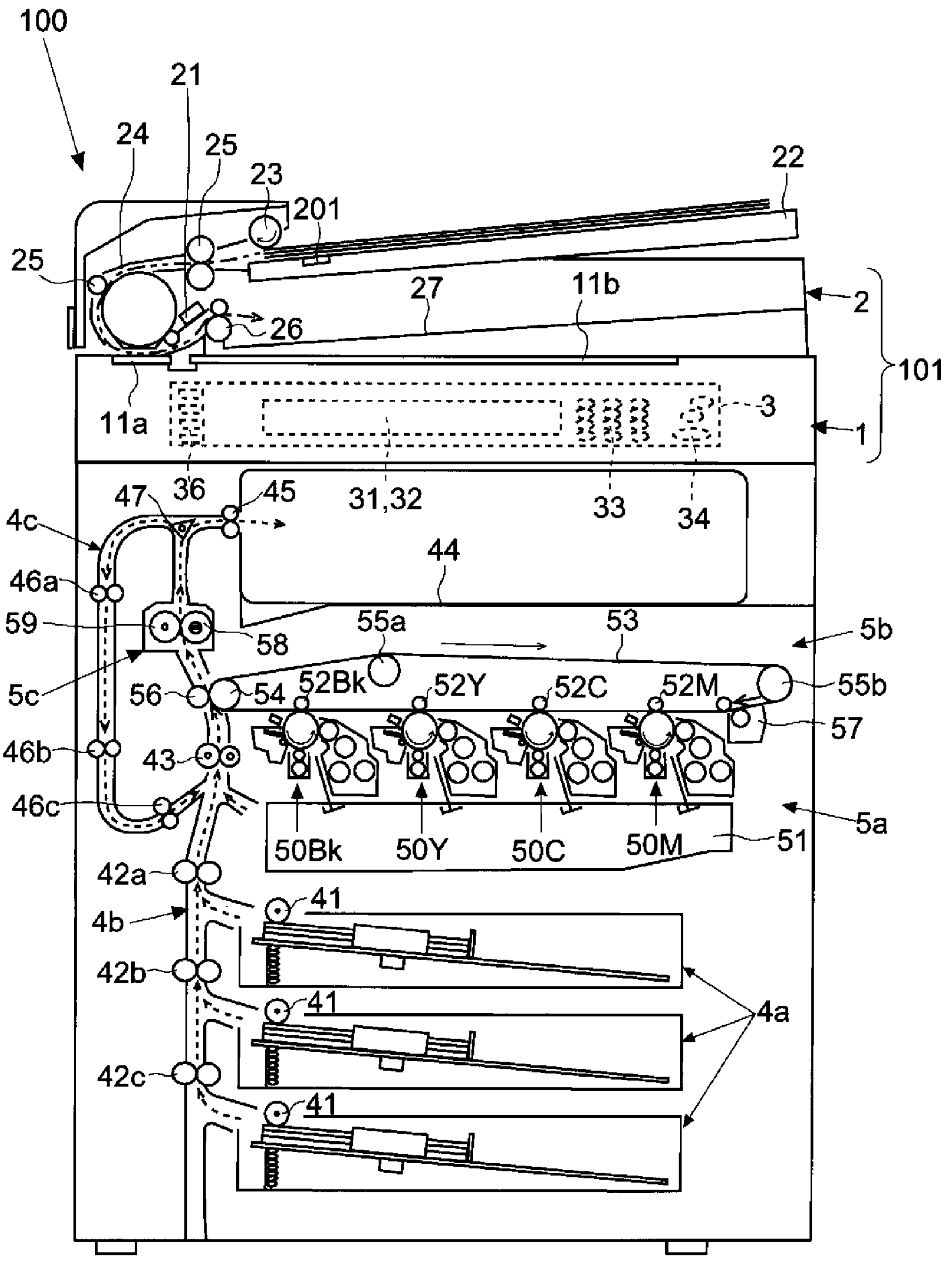
FIG. 1 is a schematic front cross-sectional view of an outline of the configuration of a multifunctional peripheral.

First, an outline of a multifunctional peripheral 100 according to the embodiment will be described with reference to FIG. 1. FIG. 1 is a schematic front cross-sectional view of an outline of the configuration of a multifunctional peripheral 100.

As shown in FIG. 1, a reading part 101 is disposed on the upper part of the multifunctional peripheral 100 according to the present embodiment. The reading part 101 includes an image reading part 1 and a document feeder part 2 (equivalent to a double-sided reading mechanism). The image reading part 1 directs light upon the upper surface of a feed reading contact glass 11*a* or a flatbed reading contact glass 11*b*, reads the front side of a document on the basis of the reflected light, and forms image data. The document feeder part 2 is provided above the image reading part 1, opens and closes in the vertical direction with respect to the image reading part 1, feeds a document towards the feed reading contact glass 11*a*, reads the rear side of the document, and forms image data. The reading part 101 will be described in detail below.

As shown in FIG. 1, an operation panel 3 (equivalent to an operation part) is provided on a front side of the image reading part 1. The operation panel 3 accepts various settings inputs from a user. The operation panel 3 will be described in detail below.

As shown in FIG. 1, the multifunctional peripheral 100 according to the present embodiment includes a paper supplier part 4*a*, feed path 4*b*, image forming part 5*a*, intermediate transfer part 5*b*, fuser part 5*c*, and the like within a main body thereof Each of the plurality of paper supplier parts 4*a* within the main body of the multifunctional peripheral 100 contains a plurality of sheets of a variety of paper sizes (for example, Letter size, A- and B-series sizes such as A4 and B4, and the like) and types (for example, copy paper, recycled paper, card stock, and the like). When printing is performed, a paper feed roller 41 of one of the paper supplier parts 4*a* begins to rotate, sending paper one sheet at a time into the feed path 4*b*.

The feed path 4*b* is a path along which paper is conveyed within the device. The feed path 4*b* is provided with guide plates for guiding the paper, a feed roller pair 42 that rotatably drives when paper is being fed (from above in FIG. 1, 42*a*, 42*b*, 42*c*; three in total), a resist roller pair 43 that stops the fed paper before the image forming part 5*a* and feeds the paper at a timing concurrent with the transfer of a formed toner image, and the like. A delivery roller pair 45 for outputting the paper to a delivery tray 44 after transfer is complete is also provided.

A double-sided feed path 4*c* connecting the downstream side of the fuser part 5*c* and the upstream side of the resist roller pair 43 is provided as a type of feed path 4*b*. When double-sided printing is performed, the delivery roller pair 45 first feeds paper printed upon one side in the direction of the delivery tray 44, then performs a switchback operation in which the rollers rotate in the opposite direction and feed the paper towards the double-sided feed path 4*c*. A plurality of double-sided delivery roller pairs 46 for feeding the paper towards the resist roller pair 43 are provided in the double-sided feed path 4*c* (from above in FIG. 1, 46*a*, 46*b*, 46*c*; three in total). At the point where the delivery roller pair 45 direction and the double-sided feed path 4*c* direction fork, a directional valve 47 is provided, the directional valve 47 being adapted to rotate in order to guide the paper feeding direction. After the front and reverse sides of the paper printed on one side have been reversed by the delivery roller pair 45 and the directional valve 47, the paper is fed towards the resist roller pair 43. The unprinted side can then be printed in order to perform printing upon both sides of the paper.

The image forming part 5*a* includes a plurality of image forming units 50 (50Bk for black, SOY for yellow, 50C for cyan, and 50M for magenta) and an exposure device 51. Each of the image forming units 50 has a photosensitive drum supported so as to be rotatably drivable, and an electrostatic device, a developer device, and a cleaning device disposed in the vicinity of the photosensitive drum. The exposure device 51 outputs while lighting and extinguishing a laser light on the basis of the image data or the like read by the image reading part 1, and scans and exposes the photosensitive drum. A toner image is formed on the circumference of the photosensitive drum by each of the image forming units 50 and the exposure device 51.

The intermediate transfer part 5*b* is subjected to a primary transfer of a toner image from each of the image forming units 50, and performs a secondary transfer upon the paper. The intermediate transfer part 5*b* includes primary transfer rollers 52Bk through 52M, an intermediate transfer belt 53, a driver roller 54, a plurality of driven rollers 55*a*, 55*b*, a secondary transfer roller 56, and a belt cleaning device 57. The endless intermediate transfer belt 53 is sandwiched between each of the primary transfer rollers 52Bk through 52M and the corresponding photosensitive drum. A transfer voltage is applied to each of the primary transfer rollers 52Bk through 52M. The toner image is thereby transferred to the intermediate transfer belt 53.

The intermediate transfer belt 53 is wrapped around the driver roller 54 and each of the primary transfer rollers 52Bk through 52M. The intermediate transfer belt 53 runs due to the rotational driving of the driver roller 54 connected to the motor and other drive mechanisms (not illustrated). The intermediate transfer belt 53 is sandwiched between the driver roller 54 and the secondary transfer roller 56. After the toner images formed on each of the image forming units 50 (black, yellow, cyan, and magenta) is overlappingly primarily transferred in order onto the intermediate transfer belt 53 without deviation, the images are transferred to the sheet by the secondary transfer roller 56, to which a predetermined voltage is applied.

The fuser part 5*c* fuses the transferred toner image to the paper. The fuser part 5*c* includes a heating roller 58 containing a heat source and a pressure roller 59 pressing thereagainst. When the paper passes a nip formed by the heating roller 58 and the pressure roller 59, the toner is melted and heated. The toner image is thereby fused to the paper. The paper outputted from the fuser part 5*c* is sent to the delivery tray 44 or the double-sided feed path 4*c*.

(Configuration of the Reading Part 101)

Figure 2:
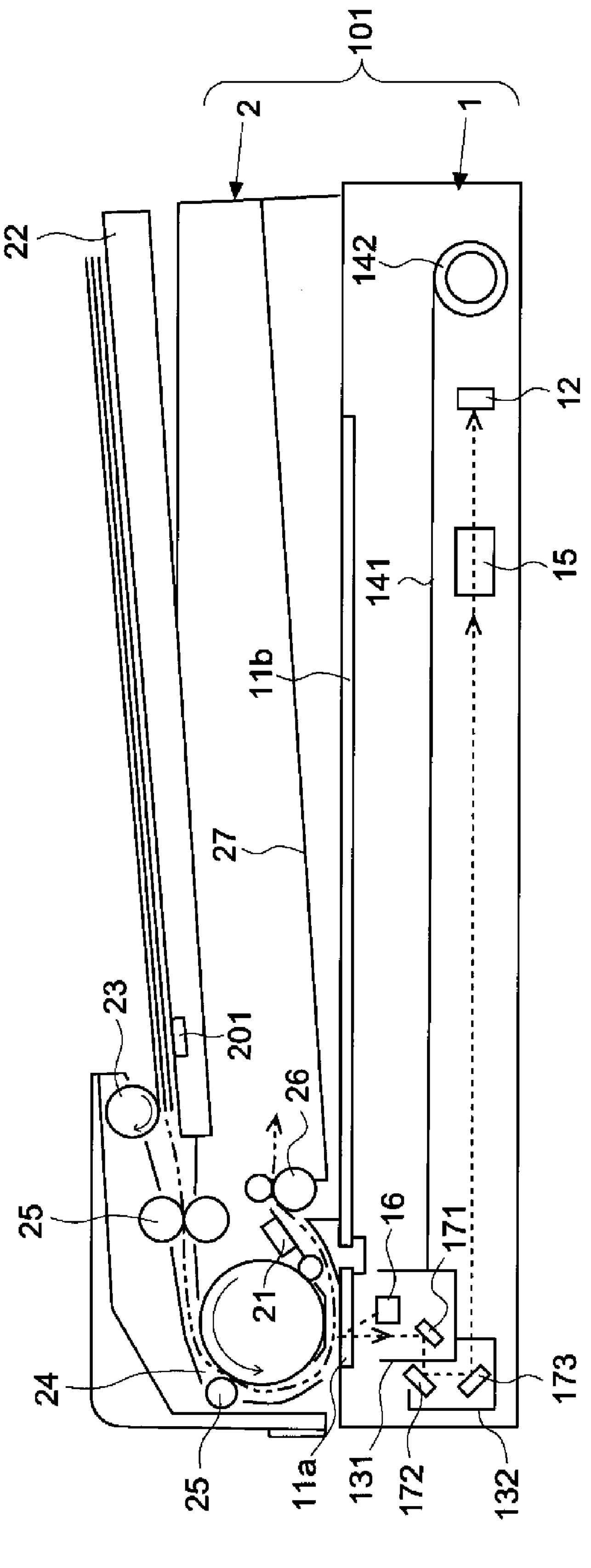
FIG. 2 is a schematic front cross-sectional view of one example of a reading part.

Next, an example of the reading part 101 according to the embodiment will be described with reference to FIG. 2. FIG. 2 is a schematic front cross-sectional view of one example of a reading part 101.

As described above, the reading part 101 includes an image reading part 1 and a document feeder part 2. First, the image reading part 1 will be described. As shown in FIGS. 1 and 2, the image reading part 1 has a box-shaped housing. A transparent, plate-shaped feed reading contact glass 11*a* extending in a direction perpendicular to the surface of FIG. 2 is disposed to the left side of the upper surface of the image reading part 1. A transparent, plate-shaped flatbed reading contact glass 11*b* extending in a direction perpendicular to the surface of FIG. 2 is disposed to the right side of the upper surface of the image reading part 1. When one sheet of a book or other document is read at a time, the document feeder part 2 is lifted, the side to be read turned face-down, and the document placed on the flatbed reading contact glass 11*b*.

As shown in FIG. 2, a first movable frame 131, a second movable frame 132, a wire 141, a take-up drum 142, a lens 15, a first light source 16 (for instance, an LED or fluorescent tube) for directing light upon a document, and a first image sensor 12, which the light directed upon the document strikes, for reading the document one line at a time and forming image data are provided within the housing of the image reading part 1. For example, the first image sensor 12 is constituted by a charge coupled device (CCD) with photoelectric conversion elements forming a line. The first image sensor 12 reads the front side of the document one line at a time on the basis of the light reflected off of the document.

The light emitted by the first light source 16 and reflected off of a document on the feed reading contact glass 11*a* or a document on the flatbed reading contact glass 11*b* is guided to the lens 15 by being reflected off of a first mirror 171, a second mirror 172, and a third mirror 173. The lens 15 gathers the reflected light and causes it to strike the first image sensor 12. The first image sensor 12 is compatible with color reading, and includes, for example, line sensors for the three colors of red, green, and blue having rows of a plurality of light receiving elements. The first image sensor 12 converts the reflected light into an analog electrical signal corresponding to the darkness of the image. The document is read one line at a time in the primary scanning direction (direction perpendicular to the document feed direction) and continuously and repeatedly read one line at a time in the secondary scanning direction (document feed direction), and the front side of the single document sheet is read.

The first movable frame 131 supports the light-reflecting first light source 16 above and the first mirror 171 below. The second movable frame 132 supports the second mirror 172 above and the third mirror 173 below. The first light source 16 and each of the mirrors have a shape extending in the direction parallel to the surface of FIG. 2. The first movable frame 131 is disposed above the second movable frame 132. A plurality of wires 141 are attached to the first movable frame 131 and the second movable frame 132 (only one shown in FIG. 2 for convenience). The other ends of the wires 141 are connected to the take-up drum 142, and the take-up drum 142 rotates in clockwise and counterclockwise directions while being driven by a take-up motor 14 (cf. FIG. 4). The first movable frame 131 and second movable frame 132 freely move in the horizontal direction through the rotation of the take-up drum 142.

Next, the operation for reading the front side of the document will be described. When reading of the front side of the document being fed by the document feeder part 2 or simultaneous double-sided reading is being performed, the take-up motor 14 performs driving, whereupon the first movable frame 131 and second movable frame 132 are fixed at a position (reading position) below the feed reading contact glass 11*a*. Next, the first light source 16 directs light upon a passing document. Each of the pixels of the first image sensor 12 then outputs an analog electrical signal according to the reflected light.

On the other hand, when a document placed upon the flatbed reading contact glass 11*b* is read, the first movable frame 131 and second movable frame 132 are moved horizontally from home position in the direction of the right side of FIG. 2 by the take-up drum 142 and the wires 141. Through repeating the scanning operation in order to the end of the document, the entire document is read, and an image of the document is converted into an analog electrical signal.

Next, the document feeder part 2 will be described. The document feeder part 2 automatically and continuously feeds one sheet at a time of the document being read to the reading position (the feed reading contact glass 11*a* described hereafter). In order from the upstream side of the document feed direction, the document feeder part 2 has a document tray 22, a document feed roller 23, a document path 24, a plurality of document feed roller pairs 25, a document delivery roller pair 26, and a document delivery tray 27, and the like. The document feeder part 2 is attached to the image reading part 1 so as to be freely openable and closable with respect to the vertical direction with a pivot point located towards the interior of the surface of FIG. 2, and functions as a cover pressing down upon the contact glasses of the image reading part 1.

A plurality of sheets of documents to be read is placed on the document tray 22 with the front sides thereof facing upward. The document feed roller 23 contacts the uppermost document of the documents placed on the document tray 22. When the multifunctional peripheral 100 receives input indicating to perform document scanning, such as pressing a START key 34, the document feed roller 23 feeds one document at a time into the document path 24.

The fed document is guided by the plurality of document feed roller pairs 25 and the guides, and passes the upper surface of the feed reading contact glass 11*a* provided on the upper surface of the image reading part 1. When the document passes by, the image reading part 1 performs reading. When reading of the document is complete, the document is output by the document delivery roller pair 26 to the document delivery tray 27 (document feed route indicated by double-dotted dashed line). The various rotating bodies (document feed roller 23, document feed roller pair 25, document delivery roller pair 26) within the document feeder part 2 have a document feed motor 28 as a drive source (cf. FIG. 4).

The document feeder part 2 is provided with, for example, a second image sensor 21 (equivalent to a double-sided reading mechanism) for reading the rear side of a fed document, the sensor being disposed in the vicinity of the document feed direction upstream side of the document delivery roller pair 26. The second image sensor 21 is a contact image sensor (CIS). The second image sensor 21 is compatible with color reading, and includes, for example, line sensors for the three colors of red, green, and blue having rows of a plurality of light receiving elements. The second image sensor 21 also includes a second light source 29 (for example, an LED or fluorescent tube; cf. FIG. 4) for directing light on the rear side of a document, a lens for guiding the light reflected off of the document, and the like.

The second image sensor 21 reads the rear side of the document in the primary scanning direction (direction perpendicular to the document feed direction) one line at a time concurrently with the feeding of the document. The second image sensor 21 converts the reflected light into an analog electrical signal corresponding to the darkness of the image. The document is continuously and repeatedly read one line at a time in the secondary scanning direction (document feed direction), and the rear side of the single document sheet is read. Thus, the document feeder part 2 and the second image sensor 21 operate as a double-sided reading mechanism for reading both sides of a document.

The reading part 101 according to this embodiment has a second image sensor 21 provided in the document feeder part 2, and reads both sides of the document roughly simultaneously. However, in another acceptable configuration, a second image sensor 21 is not provided, the document delivery roller pair 26 performs a switchback operation, a reconverging document feed path into which the document is fed a second time is provided upstream of the feed reading contact glass 11*a*, and the first image sensor 12 also reads the rear side of the document. In this case, the document delivery roller pair 26 and reconverging document feed path operate as a double-sided reading mechanism.

(Hardware Configuration of Multifunctional Peripheral 100)

Figure 3:
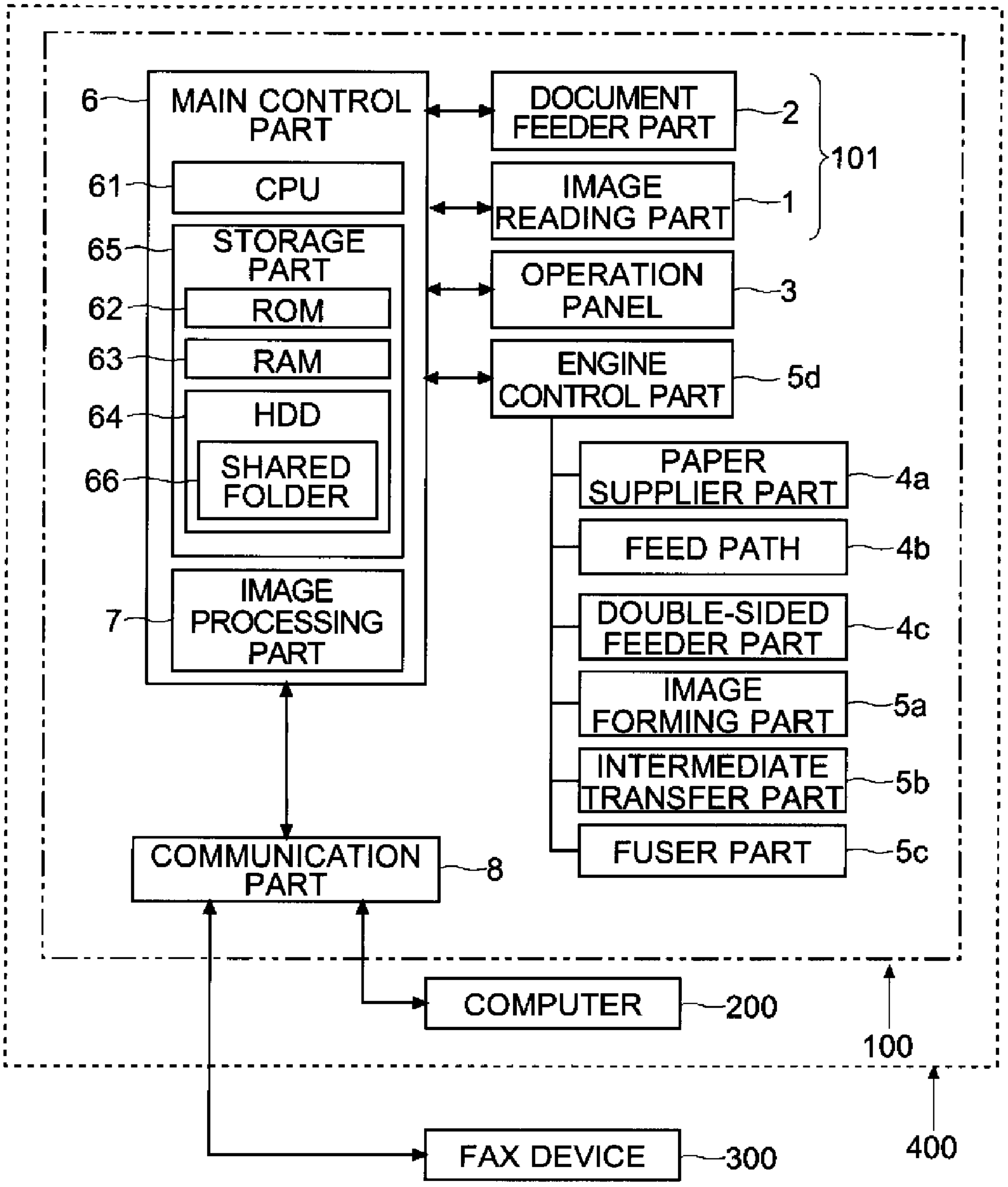
FIG. 3 is a block diagram showing one example of the hardware configuration of a multifunctional peripheral.

Next, an example of the hardware configuration of the multifunctional peripheral 100 according to an embodiment of the present disclosure will be described with reference to FIG. 3. FIG. 3 is a block diagram showing one example of the hardware configuration of the multifunctional peripheral 100.

The multifunctional peripheral 100 is provided with a main control part 6 responsible for overall control, the control part performing control, communication control, and image processing for the various parts of the multifunctional peripheral 100. The main control part 6 is provided with a CPU 61 as a central processing unit. A storage part 65 is provided in the main control part 6 (the storage part may also be provided externally to the main control part 6). The storage part 65 is formed from a read-only memory (ROM) 62, a random access memory (RAM) 63, a hard disk drive (HDD) 64, and volatile and non-volatile storage devices such as flash ROM and the like.

The storage part 65 stores programs, data, and the like for controlling the multifunctional peripheral 100. The main control part 6 uses the programs and data stored in the storage part 65 to control each part and cause printing and data transmission to be performed. The storage part 65 (for example, the HDD 64) is also capable of storing and accumulating image data based on the reading performed by the reading part 101.

The main control part 6 is also provided with an image processing part 7 for performing image processing upon image data obtained through the reading performed by the reading part 101 and image data stored in the storage part 65. For example, the image processing part 7 includes a dedicated image processing integrated circuit, such as an ASIC or an FPGA, and memory. The image processing part 7 is capable of performing various types of image processing for printing or transmitting data to an external recipient, including image correction processing such as correction processing (gamma correction processing and the like) and shading correction, darkness conversion processing, enlarging/shrinking processing, rotation processing, data format conversion, page deletion processing, various types of filter processing, and the like. The image processing part 7 is also capable of performing other types of image processing (for example, border deletion processing), but description of these will be omitted, and the image processing part will be assumed to be capable of performing known methods of image processing.

The multifunctional peripheral 100 is also provided with a communication part 8 for transmitting and receiving image data to and from an computer 200 (equivalent to an information processing device) or a FAX device 300. The communication part 8 receives image data to be printed or printer settings data from the computer 200 or the FAX device 300 (printer/FAX function). The communication part 8 is capable of transmitting image data formed on the basis of the document reading performed by the reading part 101 and stored in the storage part 65 to the computer 200 or FAX device 300 (transmission function). The main control part 6 is communicably connected with the operation panel 3. The content inputted using the operation panel 3 and job execution instructions are conveyed to the main control part 6.

The main control part 6 is also communicably connected to an engine control part 5*d* for controlling printing. The engine control part 5*d* controls image formation, the ON/OFF state of a motor for causing the rotating bodies to rotate, and the like. It is also acceptable not to provide an engine control part 5*d*, with the main control part 6 performing printing control instead. The engine control part 5*d* is connected to the paper supplier parts 4*a*, feed path 4*b*, double-sided feed path 4*c*, image forming part 5*a*, intermediate transfer part 5*b*, fuser part 5*c*, and the like. When printing is performed, the main control part 6 issues printing instructions to the engine control part 5*d* according to the settings inputted using the operation panel 3. The engine control part 5*d* controls the operation of the various parts on the basis of the instructions received from the main control part 6.

The main control part 6 is also communicably connected with the image reading part 1 and the document feeder part 2. In order to perform copying, image data transmission, or the like, the main control part 6 issues operation instructions to the image reading part 1 and the document feeder part 2 when the document is being read. The image reading part 1 (and document feeder part 2 when double-sided reading is being performed) reads the document. Then, for example, the main control part 6 receives the document image data, causes the image processing part 7 to process the image data, and, on the basis of the processed image data, causes the engine control part 5*d* to perform printing (copying), the communication part 8 to transmit the image data (transmission function), or the HDD 64 of the storage part 65 to store the data (box function).

(Process of Reading a Document Using the Reading Part 101)

Figure 4:
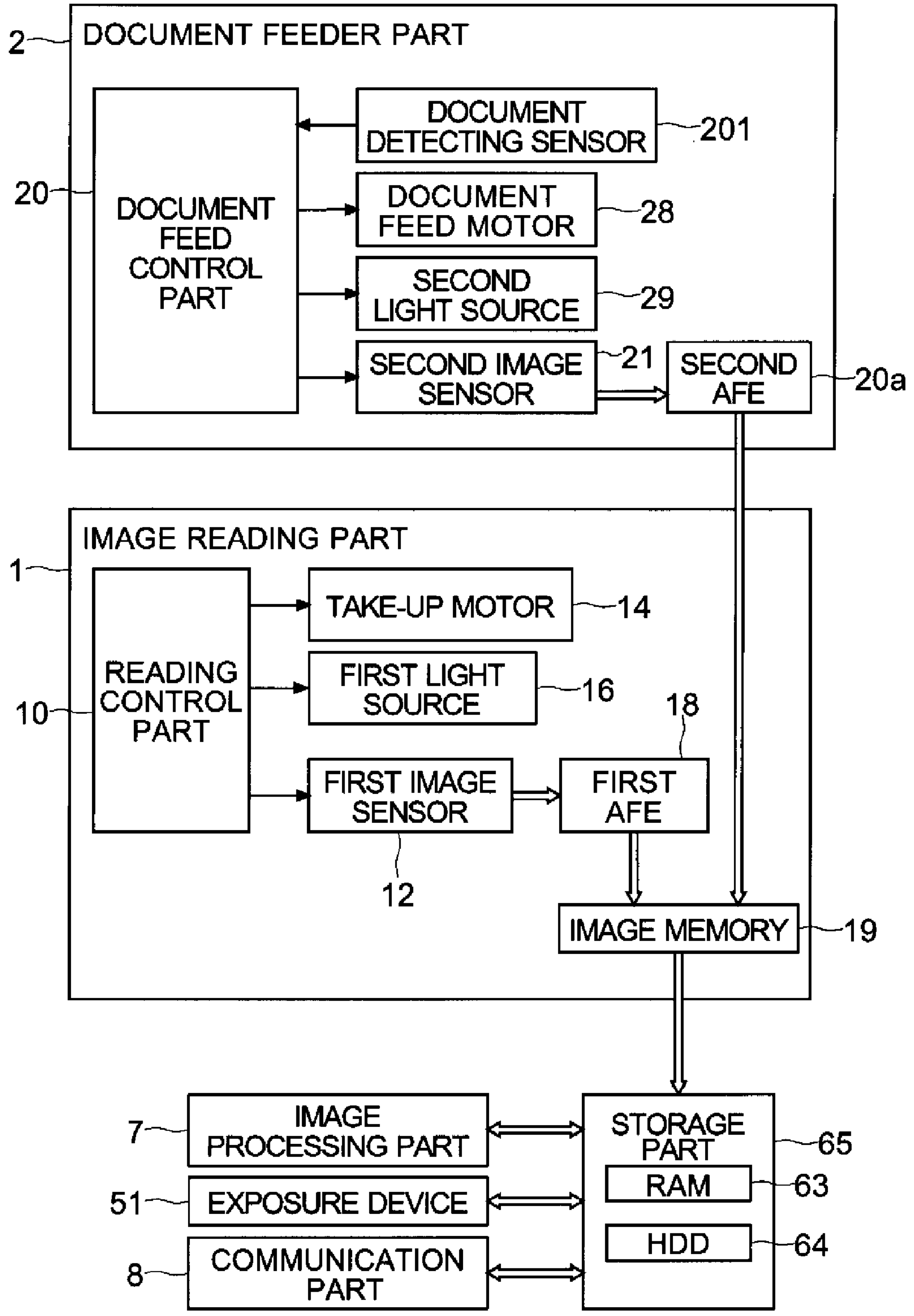
FIG. 4 is a block diagram illustrating one example of the process of reading a document using the reading part.

Next, an example of a process of reading a document using the reading part 101 according to the embodiment will be described with reference to FIG. 4. FIG. 4 is a block diagram illustrating an example of the process of reading a document using the reading part 101.

As described above, the reading part 101 according to the present embodiment includes an image reading part 1 and a document feeder part 2. The image reading part 1 is provided with a reading control part 10 for controlling the operation of the image reading part 1. Meanwhile, the document feeder part 2 is provided with a document feed control part 20 for controlling the operation of the document feeder part 2.

First, a process of reading a document using the image reading part 1 will be described. The reading control part 10 is communicably connected to the main control part 6 and the document feed control part 20. The reading control part 10 receives instructions and signals from the main control part 6 and controls the operation of the members within the image reading part 1.

The reading control part 10 is, for example, a circuit board including a CPU as a central processing unit and ROM and RAM as storage devices for storing control programs and data. When instructions to read a document are received from the main control part 6, the reading control part 10 causes the take-up motor 14 to drive, the take-up drum 142 to rotate, and the first movable frame 131 and second movable frame 132 to move to a position suitable for reading.

The image reading part 1 is also provided with a first light source 16, a first image sensor 12 a first analog front end (AFE) 18, image memory 19, and the like involved in reading the front side of the document.

When instructions to read a document (front side reading) are received from the main control part 6, the image reading part 1 causes the first light source 16 to be illuminated. The first image sensor 12 then reads the front side of the document. The first image sensor 12 has a plurality of reading resolutions, such as 1,200 dpi, 600 dpi, and 300 dpi, and is capable of performing reading at any one of these resolutions. The analog signals outputted by each of the light receiving elements (photoelectric conversion elements) of the first image sensor 12 are inputted to the first AFE 18. The first AFE 18 includes, for example, an analog signal amplifier, an auto gain control (AGC) circuit, an ODD/EVEN correction circuit for correcting the difference between the properties of the odd-numbered signals and the even-numbered signals outputted from the first image sensor 12, an A/D conversion circuit for converting the analog signals modified by the correction and control circuits to digital signals, and the like. The image data converted to a digital signal by the first AFE 18 is inputted to the image memory 19.

Next, a process of reading a document using the document feeder part 2 will be described. The document feed control part 20 is connected with the main control part 6 and reading control part 10 described above, receives instructions and signals from the main control part 6 and reading control part 10, and controls the operation of the members provided in the document feeder part 2.

The document feed control part 20 is, for example, a circuit board including a CPU as a central processing unit and ROM and RAM as storage devices for storing control programs and data. For example, when instructions to read a document are received from a control part 6, the document feed control part 20 causes the document feed motor 28 to drive, the document feed roller 23, document feed roller pair 25, and the like to rotate, and the document placed in the document tray 22 to be fed.

The document tray 22 is provided with a document detecting sensor 201 for detecting whether a document has been placed in the document tray 22 (cf. FIG. 2 and the like). The document detecting sensor 201 is, for example, an optical sensor whose output changes depending upon whether a document is or is not placed in the document tray 22. The output of the document detecting sensor 201 is inputted to the document feed control part 20. The document feed control part 20 recognizes whether or not a document is placed in the document tray 22 on the basis of the output from the document detecting sensor 201 (for example, high or low).

When double-sided reading is performed, such as in a case where instructions to read both sides of a document are received by the operation panel 3, the main control part 6 issues instructions to read the rear side of the document to the document feed control part 20. The document feeder part 2 is provided with the second light source 29, the second image sensor 21, and a second AFE 20*a* for reading the rear side of the document.

When instructions to read the rear side of a document are received from the main control part 6, the document feed control part 20 illuminates the second light source 29. The second image sensor 21 then reads the rear side of the passing document. The second image sensor also has a plurality of reading resolutions, such as 1,200 dpi, 600 dpi, and 300 dpi, and is capable of performing reading at any one of these resolutions. The second image sensor 21 outputs the analog signals from each of the light receiving elements (photoelectric conversion elements) and inputs the signals to the second AFE 20*a*. The second AFE 20*a* includes, for example, an analog signal amplifier for the analog signal, an auto gain control (AGC) circuit, an ODD/EVEN correction circuit for correcting the difference between the properties of the odd-numbered signals and the even-numbered signals outputted from the second image sensor 21, an A/D conversion circuit for converting the analog signals modified by the correction and control circuits to digital signals, and the like. The second AFE 20*a* performs processing similar to that performed by the first AFE 18, but because the first image sensor 12 and second image sensor 21 are of different types, the parameters for each type of processing differ. The image data converted to a digital signal by the second AFE 20*a* is inputted to the image memory 19.

The image memory 19 is, for example, DRAM. The image memory 19 outputs the formed image data to the storage part 65. Then, for example, the image data is temporarily accumulated in the RAM 63 of the main control part 6, and the image processing part 7 in the main body performs separate image processing, after which the data is outputted to the exposure device 51 for printing (in the case of copying) or transmission (in the case of scanning and transmitting), or stored in the storage part 65 (for example, in the HDD 64). The reading part 101 may also be separately provided with one or a plurality of image processing parts, and the various types of image processing involved in reading the document performed within the reading part 101.

(Configuration of Operation Panel 3)

Figure 5:
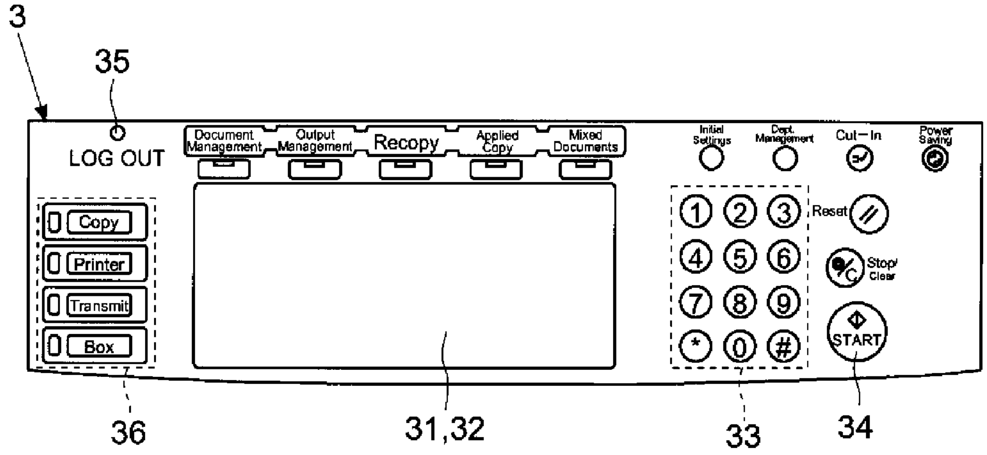
FIG. 5 is a plan view of one example of an operation panel.
Figure 6:
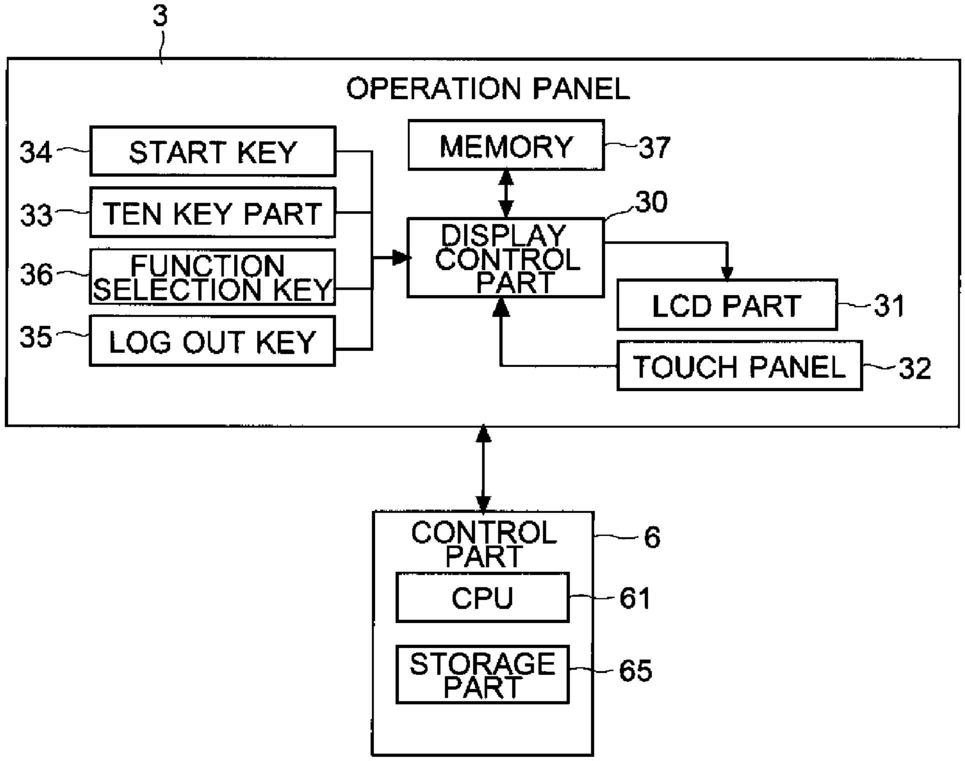
FIG. 6 is a block diagram showing one example of the configuration of an operation panel.

Next, an example of the hardware configuration of an operation panel 3 of the multifunctional peripheral 100 according to an embodiment of the present disclosure will be described with reference to FIGS. 1, 5, and 6. FIG. 5 is a plan view of one example of an operation panel 3. FIG. 6 is a block diagram showing one example of the configuration of an operation panel 3.

As shown by the dotted lines in FIG. 1, the operation panel 3 is provided on an upper portion of the front surface of the multifunctional peripheral 100. As shown in FIGS. 5 and 6, the operation panel 3 has an LCD part 31 that displays the status of the multifunctional peripheral 100 and various messages. The LCD part 31 is capable of displaying one or a plurality of keys for selecting a function or setting a value for a selected function.

As shown in FIGS. 5 and 6, a touch panel 32 (for example, a low-resistive touch panel) is provided on the upper surface of the LCD part 31. The touch panel 32 is for determining the position/coordinates of a touched part of the LCD part 31. There are no particular limitations upon the type of touch panel 32 used; instead of a low-resistive touch panel, a surface acoustic wave touch panel, an infrared touch panel, a capacitive touch panel, or another type of touch panel may be employed.

The operation panel 3 also has a ten key part 33 for inputting numbers such as the number of printed copies, a START key 34 for issuing instructions to begin copying or data transmission (scanning, etc.), and a LOG OUT key 35 for directly issuing instructions to log out when in a logged-in state. A function selection key set 36 (COPY key, BOX key, and the like) that are pressed to select usage and settings functions (examples shown in FIG. 5 are COPY, PRINTER, TRANSMIT, and BOX function) is also provided. In this way, the operation panel 3 is provided with hard keys for input and settings.

As shown in FIG. 6, a display control part 30 and memory 37 for storing various types of data such as a function selection screen, a settings screen for setting values for the selected function, and various displayed messages are provided within the operation panel 3. The display control part 30 is connected to the START key 34, ten key part 33, function selection key set 36, and a scanning START key K7 provided on the operation panel 3, and recognizes a pressed key.

The display control part 30 controls what is displayed on the LCD part 31. For example, data for screens and images displayed on the LCD part 31 is stored in the memory 37 (screen and image data may also be stored in the storage part 65, with the display control part 30 receiving image data via communication). The display control part 30 controls what is displayed on the LCD part 31 on the basis of the screen and image data stored in the memory 37. For example, the display control part 30 changes what is displayed on the LCD part 31 according to user operation/input.

The display control part 30 is also connected to the touch panel 32. When a low-resistive touch panel 32 is used, the voltage outputted from the low-resistive screen changes depending upon the pressed position. The display control part 30 recognizes the pressed position (coordinates) on the LCD part 31 on the basis of the voltage outputted by the touch panel 32. The display control part 30 recognizes which of the keys displayed on the LCD part 31 was pressed from the data for the screen or image currently being displayed upon the LCD part 31 and the coordinates. A user is thereby capable of pressing a key displayed on the LCD part 31 (on the basis of the displayed material and the touch panel 32), selecting from among the various functions of the multifunctional peripheral 100, setting a settings value, and selecting a mode.

(Registering User Information)

Figure 7:
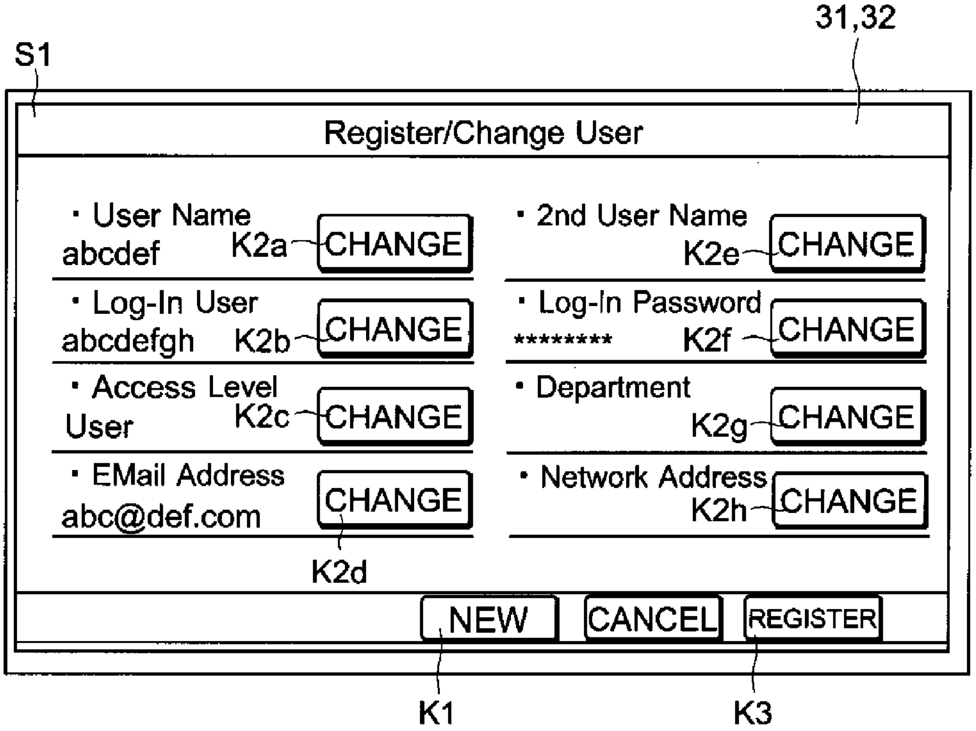
FIG. 7 is an illustration of one example of a user registration screen.
Figure 8:
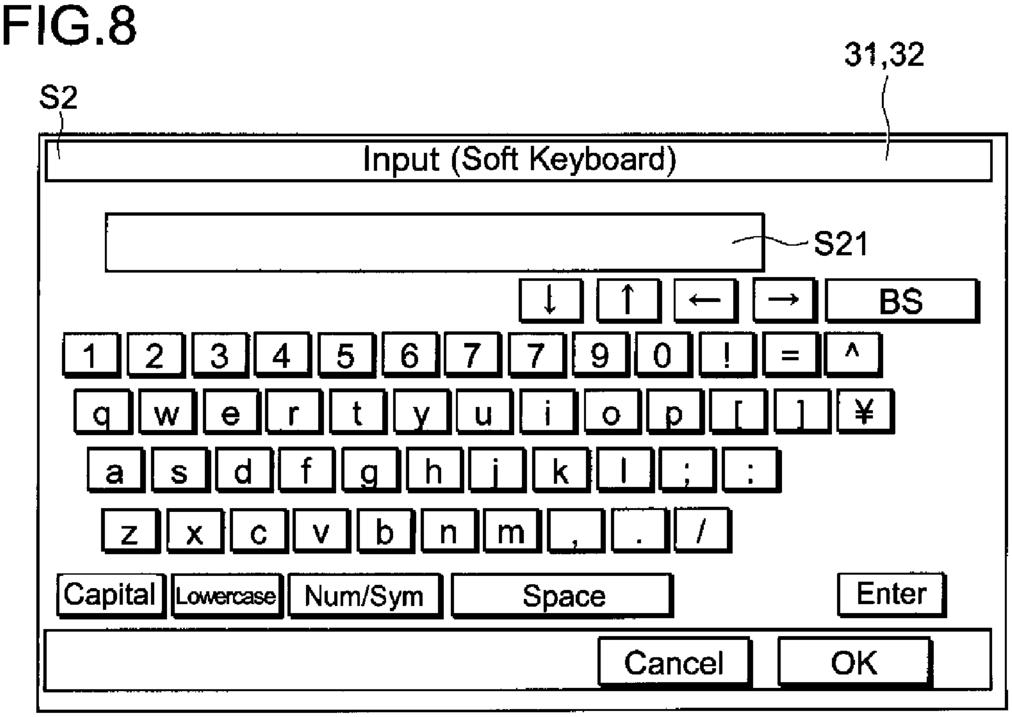
FIG. 8 is an illustration of one example of a soft keyboard screen.

Next, an example of registering a user of the multifunctional peripheral 100 will be described with reference to FIGS. 7 and 8. FIG. 7 is an illustration of one example of a user registration screen S1. FIG. 8 is an illustration of one example of a soft keyboard screen S2.

In the present embodiment, user certification (identification) is performed using the operation panel 3; in order to do this, a user must be pre-registered. The pre-registered user information is used as certification information for performing certification.

As shown in FIG. 7, when a predetermined input is performed upon the operation panel 3 and a desired user is called up, the user registration screen S1 is displayed. For example, the user registration screen S1 can only be opened by an authorized individual, such as an administrator of the multifunctional peripheral 100.

When the administrator presses the NEW key K1 on the user registration screen S1, a new user of the multifunctional peripheral 100 can be registered. Examples of registerable content (items) include "user name", "second user name", "log-in user name", "log-in password", "access level", "department", "mail address", "network address" (for example, an IP address), and the like (it is also acceptable for there to be even more registerable items). Nothing is displayed for unregistered items (in FIG. 7, for example, "second user name").

A CHANGE key K2 (K2*a* through K2*h*) is provided for each item. For example, when one of the CHANGE keys K2 is pressed, the display control part 30 causes the LCD part 31 to display a soft keyboard screen S2 such as that shown in FIG. 8. Numerals, characters, and the like can be inputted using the soft keyboard screen S2. The image data for displaying the soft keyboard screen S2 is stored in, for example, the memory 37. A user can press a key displayed on the soft keyboard screen S2 to input characters or the like. As shown in FIG. 8, the soft keyboard screen S2 includes keys for inputting, for example, alphabetical letters, symbols, numerals, and the like. The inputted character string is displayed in an input character display field S21.

In this way, it is possible to register a new user of the multifunctional peripheral 100 or change the registration for an already registered user. When a REGISTER key K3 is pressed, the material inputted on the user registration screen S1 is stored as certification information in the memory 37 (or in the storage part 65).

(Certification in the Multifunctional Peripheral 100)

Figure 9:
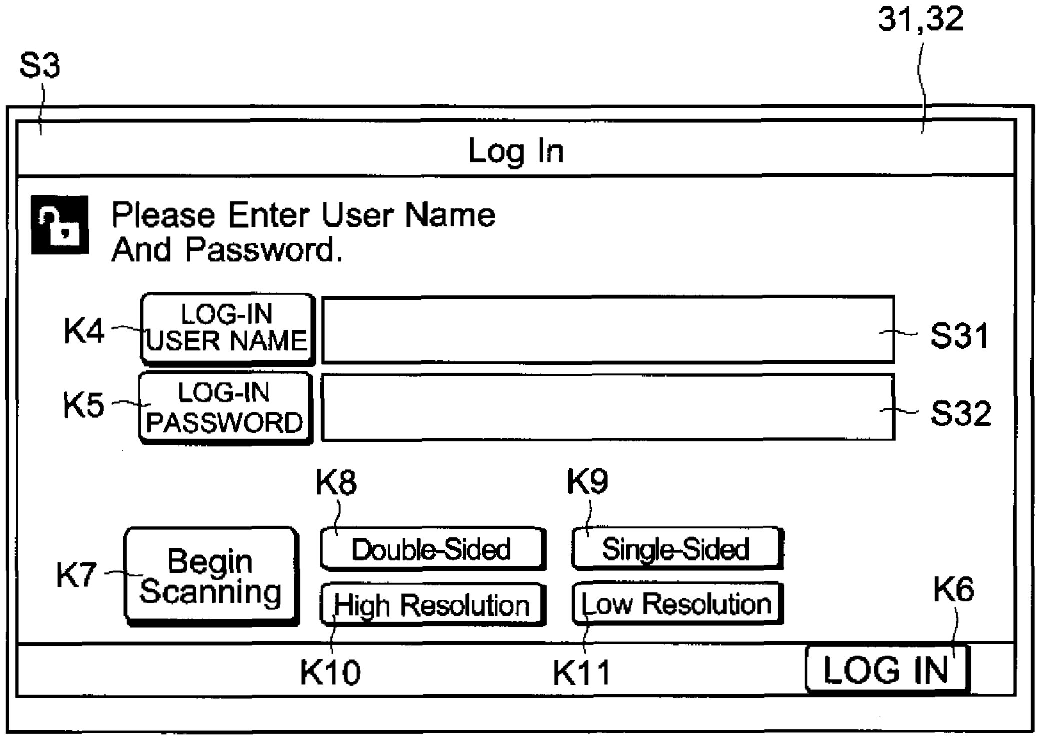
FIG. 9 is an illustration of one example of a log-in screen on an operation panel.

Next, an example of certification (logging in) in the multifunctional peripheral 100 according to the present embodiment will be described with reference to FIG. 9. FIG. 9 is an illustration of one example of a log-in screen S3 on an operation panel 3.

The main control part 6 first starts the multifunctional peripheral 100 off in a default usage locked state (logged-out state). In the logged-out state, the operation panel 3 does not accept instructions to begin jobs or the like. For example, in the logged-out state, the operation panel 3 ignores the START key 34 even when the same is pressed, the main control part 6 ignores any operation instruction input, and document reading or printing is not performed. Even when image data is transmitted from an external computer 200, the main control part 6 may temporarily save the received image data in the storage part 65, but will not print it.

On the other hand, when certification of a permitted user is obtained, the operation panel 3 enters a logged-in state, and the main control part 6 controls the various parts and executes a job when execution instructions are received. The operation panel 3 also accepts job (copying, scanning, transmission, and the like) function selections, settings values, and instructions to begin executing a job.

In the multifunctional peripheral 100 according to the present embodiment, when a user performs copying or designates a transmission address and performs scanning, the user inputs information into the operation panel 3, is certified, and logs in. In order to log in, the user inputs information for identifying the user (identification information), such as a user name (or user ID), log-in password, or the like, at the log-in screen S3, as shown in FIG. 9. When the multifunctional peripheral 100 is in a logged-out state, the log-in screen S3 is displayed on the LCD part 31.

For example, when the user presses a LOG-IN USER NAME key K4 or a LOG-IN PASSWORD key K5, the display control part 30 causes the LCD part 31 to display a soft keyboard screen S2 such as that shown in FIG. 8. The user then input the user's own pre-registered log-in user name and log-in password. The display control part 30 then causes the inputted data to be displayed in the log-in user name display field S31 and the log-in password display field S32. The characters displayed in the log-in password display field S32 are, for example, a number of asterisks or the like corresponding to the number of characters in the password, and the password itself is not displayed.

When finished inputting the log-in user name and log-in password (identification information input), the user presses the LOG IN key K6. When the display control part 30 recognizes the LOG IN key K6 as having been pressed, certification is performed. For example, the display control part 30 compares the certification information stored in the memory 37 and the inputted identification information, and confirms whether there is any part of the certification information that matches the identification information (i.e., whether there is a matching user). When there is a matching user, the display control part 30 transmits to the main control part 6 data indicating that the multifunctional peripheral 100 may be used, or user-related data. The display control part 30 unlocks the operation panel 3, a logged-in state is entered, and any function settings or instructions to start a job are accepted.

Certification may also be performed using, for example, the main control part 6 or the storage part 65. In this case, the certification information of the user of the multifunctional peripheral 100 is pre-stored in the storage part 65. When the LOG IN key K6 is pressed, the inputted identification information is sent from the display control part 30 to the main control part 6. The main control part 6 compares the certification information stored in the storage part 65 with the accepted identification information, and confirms whether there is any part of the certification information that matches the identification information (i.e., whether there is a matching user). When there is a match, the main control part 6 recognizes that the multifunctional peripheral 100 may be set to a usable state, and transmits data indicating that the multifunctional peripheral 100 may be used or data identifying the user (for example, a user name) to the display control part 30. The display control part 30 thereby unlocks the operation panel 3, a logged-in state is entered, and any function settings for copying or the like or instructions to start a job are accepted.

After the multifunctional peripheral 100 has been used, when it remains in the logged-in state, anybody can use the multifunctional peripheral 100. For this reason, it is problematic in terms of security for the multifunctional peripheral 100 to be kept in a logged-in state. Thus, the logged-out state is entered after the multifunctional peripheral 100 or operation panel 3 has been used.

By pressing the LOG OUT key 35, the user can issue instructions to transition from the logged-in state to the logged-out state. Alternatively, after a job is completed, the display control part 30 calculates, for example, whether a predetermined amount of time (e.g., one minute; can be set using the operation panel 3) has passed since an input was last made to the operation panel 3. When a predetermined amount of time passes without any input to the operation panel 3, the display control part 30 shifts the operation panel 3 to the logged-out state, and displays the log-in screen S3. The display control part 30 also transmits data indicating the logged-out state to the main control part 6.

(Scanning in a Logged-Out State)

Next, a process of scanning while the multifunctional peripheral 100 according to the present embodiment is in a logged-out state (logged-out scanning) will be described in outline with reference to FIG. 9.

Conventionally, when scanning is performed, a user logs in and sets various settings, such as the storage location of the scanned data (for example, the address of a computer 200, a folder provided in the HDD 64 of the storage part 65 of the multifunctional peripheral 100, or the like), reading resolution, color settings for reading such as color or black and white, and the like. After the settings have been set, the user presses the START key 34 or the like and issues instructions to execute the scanning job.

However, in such a conventional scanning process, identification information for logging in and various settings must be inputted, and a certain amount of time is necessary from when the document is set in place and the user begins to input the identification information until scanning is performed.

For this reason, users wishing to use the multifunctional peripheral 100 after the user setting the settings (users waiting their turns) must wait through the process of inputting log-in information, inputting settings, and beginning job execution (pressing the START key 34), causing a waiting time. Moreover, when the user in front makes a mistake in inputting the identification information or has to redo the job due to mistaken settings or the like, user waiting time becomes even longer.

Because many operations (inputs into the operation panel 3) in front of the multifunctional peripheral 100 are necessary until a scanning job or the like is performed, the utilization rate of the multifunctional peripheral 100 (image reading device) and office productivity cannot be increased more than a fixed amount. The present embodiment enables scanning to be performed by means of a simple operating when the multifunctional peripheral 100 is in a logged-out state, decreasing user wait time and increasing the image reading device utilization rate and office productivity.

Next, a specific process for scanning while in a logged-out state will be described with reference to FIG. 9. In the multifunctional peripheral 100 according to the present embodiment, the log-in screen S3 displayed while the machine is in the logged-out state is provided with a scanning START key K7 for accepting instructions to execute scanning while in the logged-out state (logged-out scanning).

By pressing the scanning START key K7 when a document is set on the document feeder part 2 or the flatbed reading contact glass 11*b*, a user can cause the multifunctional peripheral 100 (reading part 101) to read the document even in the logged-out state. When the scanning START key K7 is pressed, the display control part 30 transmits data indicating that the scanning START key K7 has been pressed to the main control part 6. In response to this, the main control part 6 causes the reading part 101 to read the document. For example, the document feeder part 2 feeds the document placed upon the document tray 22, and the first image sensor 12 and the second image sensor 21 read the document.

The image data of the document formed by logged-out scanning is stored in a shared folder 66 (equivalent to a shared space) preset in the HDD 64 of the multifunctional peripheral 100. The shared folder 66 is accessible through the communication part 8 from an external computer 200. For this reason, it is possible to access the HDD 64 of the multifunctional peripheral 100 from the external computer 200 and perform operations upon the document image data stored in the shared folder 66. For example, the image data stored in the shared folder 66 can be taken (downloaded) into the computer 200, or the image data stored in the shared folder 66 can be deleted by the computer 200. It is thereby possible to begin scanning simply by pressing the scanning START key K7, even in the logged-out state, without having to input log-in information, storage locations, settings locations, or other settings into the operation part. Because the document image data obtained by the reading part 101 is stored in the shared space, there is no need to identify a user or set a storage location or settings location. Thus, even when the image scanning device performs certification before use (i.e., requires a user to log in), it is possible to begin scanning with only a one-touch operation of the scanning START key K7, and to minimize the amount of time spent making inputs to the operation part of the image reading device. For this reason, the waiting time of the users waiting their turns is dramatically reduced, improving the image reading device utilization rate and increasing office productivity.

Along with the scanning START key K7, the log-in screen S3 is provided with a DOUBLE SIDE key K8, a SINGLE SIDE key K9, a HIGH RESOLUTION key K10, and a LOW RESOLUTION key K11.

In the reading part 101 according to the present embodiment, the document feeder part 2 can be used to read both sides of a document. Meanwhile, the area read in double-sided reading is greater than in the case of single-sided reading, and the image data size increases as well. For this reason, double-sided reading requires more time than single-sided reading to read the document, and the productivity and utilization rate of the multifunctional peripheral 100 depends on whether both sides or one side is read. Thus, it is possible to designate the side to be read during logged-out scanning by pressing the DOUBLE SIDE key K8 or SINGLE SIDE key K9 before pressing the scanning START key K7. The reading part 101 thus switches between reading one side of the document or both sides of the document according to which key provided on the operation part (operation panel 3) is pressed. It is thereby possible to perform logged-out scanning in accordance with user wishes while promoting improved productivity.

The DOUBLE SIDE key K8 is pressed when both sides of a document are read during logged-out scanning On the other hand, the SINGLE SIDE key K9 is pressed when only one side (the front side) of a document is read during logged-out scanning The reading part 101 is thus capable of reading the document in a manner desired by the user. When neither the DOUBLE SIDE key K8 nor the SINGLE SIDE key K9 has been pressed when the scanning START key K7 is pressed, the reading part 101 reads both sides of the document. In other words, double-sided reading is the default setting for logged-out scanning It is thus possible to perform double-sided reading of a document even in a logged-out state simply by pressing the scanning START key K7, without the need to perform a complicated settings process.

The number of scanning lines is greater in high resolution reading than in low resolution reading, and the image data size is also greater. For this reason, it may take longer to read the document when reading in high resolution than when reading in low resolution. For this reason, the productivity and utilization rate of the multifunctional peripheral 100 depend upon the reading resolution. Thus, a user can press the HIGH RESOLUTION key K10 or the LOW RESOLUTION key K11 to designate logged-out scanning resolution before pressing the scanning START key K7. The reading part 101 thus switches between reading resolutions according to which key provided on the operation part (operation panel 3) is pressed. It is thereby possible to perform logged-out scanning in accordance with user wishes while promoting improved productivity.

The HIGH RESOLUTION key K10 is pressed when one performs logged-out scanning of a document at a high reading resolution. For example, in high-resolution reading, the first image sensor 12 or second image sensor 21 reads the document at 600 dpi, and the reading part 101 forms 600 dpi image data. On the other hand, the LOW RESOLUTION key K11 is pressed when one performs logged-out scanning of a document at a low reading resolution. For example, in low-resolution reading, the first image sensor 12 or second image sensor 21 reads the document at 300 dpi, and the reading part 101 forms 300 dpi image data. The reading part 101 is thus capable of reading the document at a resolution desired by the user. The resolutions of 600 dpi and 300 dpi are exemplary. A configuration wherein reading settings at a greater plurality of resolutions can be performed in addition to the reading modes (reading resolutions) possessed by each image sensor is also acceptable.

When neither the HIGH RESOLUTION key K10 nor the LOW RESOLUTION key K11 have been pressed when the scanning START key K7 is pressed, the reading part 101 performs reading at a high resolution. In other words, high resolution is the default setting for logged-out scanning.

In the foregoing description, the scanning START key K7, DOUBLE SIDE key K8, SINGLE SIDE key K9, HIGH RESOLUTION key K10, and LOW RESOLUTION key K11 are soft keys displayed on the LCD part 31, but the above keys K7 through K11 may also be provided as hard keys on the operation panel 3. In the foregoing example, four keys (the DOUBLE SIDE key K8, SINGLE SIDE key K9, HIGH RESOLUTION key K10, and LOW RESOLUTION key K11) are provided in addition to the scanning START key K7, but the number of keys for setting reading settings values may be reduced by, for example, configuring a key to respond according to the length of time it is pressed.

(Logged-Out Scanning Process)

Figure 10:
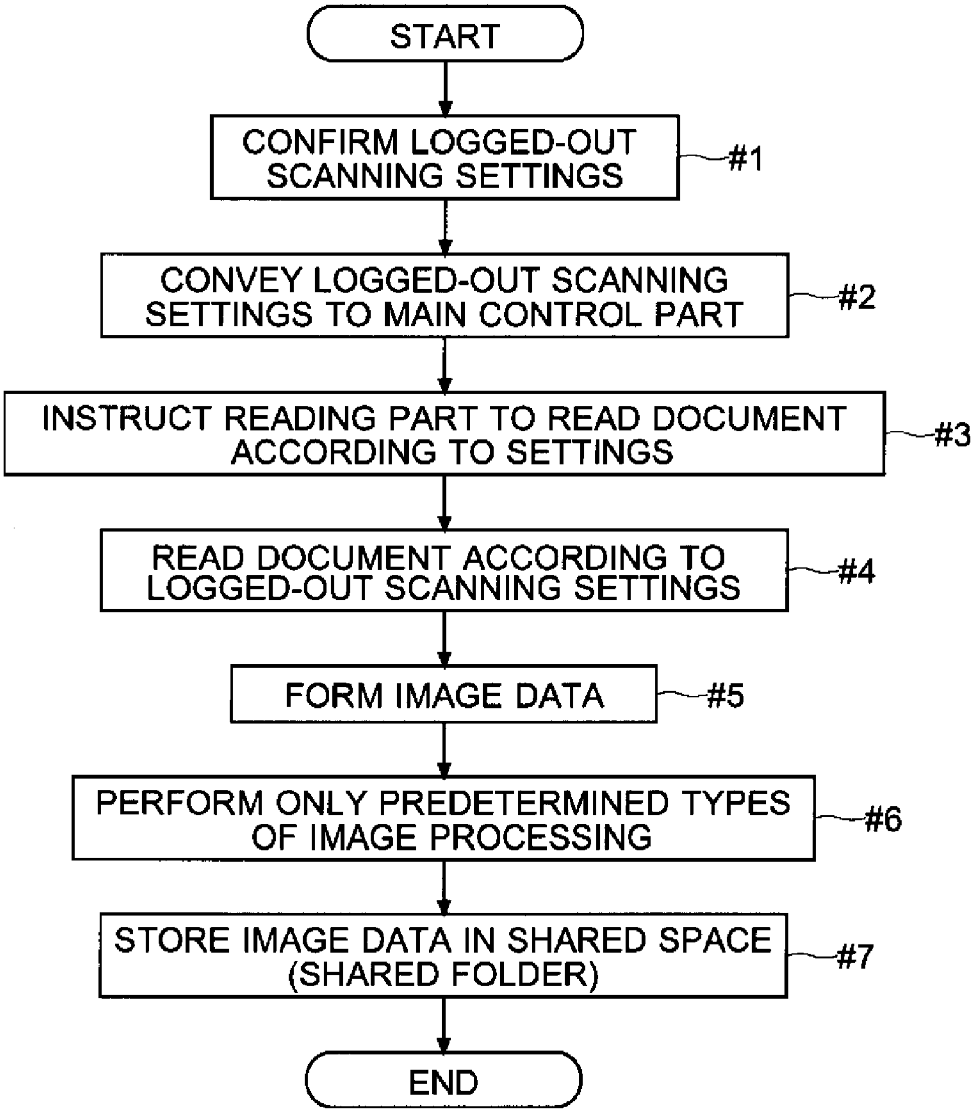
FIG. 10 is a flowchart illustrating one example of the process of scanning while in a logged-out state.

Next, a logged-out scanning processing process will be described with reference to FIG. 10. FIG. 10 is a flowchart illustrating one example of a process for scanning while in a logged-out state.

"START" in FIG. 10 is the point in time when the scanning START key K7 is pressed while the machine is in a logged-out state. When the scanning START key K7 is pressed while the machine is in a logged-out state, the display control part 30 confirms the logged-out scanning settings to determine whether to perform double-sided or single-sided reading, and whether to perform reading at high resolution or low resolution, on the basis of the settings on the log-in screen S3 (step #1). The display control part 30 then conveys the logged-out scanning settings to the main control part 6 (step #2).

In response to the notification from the display control part 30, the main control part 6 instructs the reading part 101 to read the document according to the settings (step #3).

For example, when the double-sided reading setting is selected, the main control part 6 notifies the document feed control part 20 of the document feeder part 2 that logged-out scanning is being performed, and issues instructions to feed the document and scan the read side of the document using the second image sensor 21. The main control part 6 notifies the reading control part 10 of the image reading part 1 that logged-out scanning is being performed, and issues instructions to scan the front side of the document using the first image sensor 12. The main control part 6 transmits data indicating the reading resolution and other reading settings data to the document feed control part 20 and the reading control part 10.

When the single-sided reading setting is selected and a document is set on the document tray 22 (for example, as detected by the document detecting sensor 201), the main control part 6 notifies the document feed control part 20 that logged-out scanning is being performed, and issues instructions to feed the document. If no document is set on the document tray 22 (i.e., the document detecting sensor 201 cannot detect a document set on the document tray 22), the main control part 6 does not instruct the document feed control part 20 to feed the document. The main control part 6 notifies the reading control part 10 that logged-out scanning is being performed, and issues instructions to scan the front side of the document using the first image sensor 12. The main control part 6 transmits data indicating the reading resolution and other reading settings data and the like to the document feed control part 20 and the reading control part 10.

In response to these instructions, the reading part 101 (document feeder part 2 and image reading part 1) reads the document according to the logged-out scanning settings (step #4). Image data is formed by the first AFE 18 and the second AFE 20*a* on the basis of the reading performed by each of the image sensors (step #5).

In the case of logged-out scanning, the image processing part 7 only performs image processing of a predetermined type upon the formed image data (step #6). The storage part 65 (HDD 64) stores the image data obtained by logged-out scanning in the shared space (shared folder 66) (step #7→END).

Some types of image processing cannot be reversed once performed. When irreversible image processing is performed, the user may not be able to obtain the desired image data when using the machine. Thus, in logged-out scanning, the image processing part 7 does not perform irreversible image processing so that the image data can be used later (i.e., predetermined types of image processing are not performed). The storage part 65 stores image data not subjected to the predetermined type of image processing in the shared space (shared folder 66). Specifically, the image processing part 7 does not perform, for example, color alteration, zooming, or filter image processing. On the other hand, the image processing part 7 is set to perform types of image processing, such as gamma correction or shading correction, that correct and improve picture quality. It is thereby possible to store the image data obtained by logged-out scanning in a reworkable state. Thus, a user can rework the image data obtained by logged-out scanning to a desired state.

For example, in normal scanning operations such as copying or image data transmission, various types of image processing are performed on the image data according to the settings on the operation panel 3. The image processing part 7 converts color image data obtained by the reading performed by each of the image sensors and automatically forms two-tone black-and-white or grayscale image data according to the settings in the operation panel 3 and the type of job, such as, for example, when instructions to perform two-tone black-and-white or grayscale reading are received, when black-and-white copying is performed, or when FAX transmission is performed.

Meanwhile, it is not known at the time logged-out scanning is performed in what way the image data obtained from logged-out scanning will be used. When two-tone black-and-white or grayscale image data is formed, the data cannot be reversed to a color image even when the user wished to print color image data. Thus, when logged-out scanning according to the present embodiment is performed, the storage part 65 stores the image data as color data. For this reason, the image processing part 7 does not convert the image data formed by logged-out scanning to two-tone black-and-white or grayscale image data. It is thereby possible to provide a user desiring color image data with color image data even when logged-out scanning is performed. A user desiring gray or two-tone black-and-white image data need only convert the color image data.

For example, in normal scanning processes such as copying or image data transmission, zooming (enlarging/shrinking) by image processing part 7 may be performed either according to the settings in the operation panel 3 or automatically in accordance with the size of the document or the size of the image data obtained by reading. For example, when an A4-sized document is scanned and 2-in-1 printing performed, the image processing part 7 shrinks the image data obtained by the reading performed by each of the image sensors.

Meanwhile, it is not known at the time logged-out scanning is performed in what way (at what size) the image data obtained from logged-out scanning will be used. Image data that has been enlarged or shrunk cannot be returned to its original state. Thus, in logged-out scanning according to the present embodiment, the storage part 65 stores the image data at the size at which it was read. For this reason, the image processing part 7 does not perform zoom image processing on the image data formed by logged-out scanning. It is thereby possible to provide a user with original image data so that the user can perform image processing later.

For example, in normal scanning processes such as copying or image data transmission, filter image processing may be performed either according to the settings in the operation panel 3 or automatically in accordance with the type of document (text document vs. photographic document). For example, in the case of a text document, derivative filter image processing is often performed on the image data to emphasize edges (portions where image darkness changes sharply) and increase vividness. On the other hand, in the case of a photographic document, integrating filter image processing for smoothing and reducing the differences in darkness between adjacent pixels is often performed on the image data in order to yield smooth color transitions (beautiful gradations).

Meanwhile, it is unknown at the time that logged-out scanning is performed without any document type set in what way the image data obtained by logged-out scanning should be worked (what sort of filter processing to perform). Image data that has had filter image processing performed thereupon cannot be returned to its original state. Thus, in logged-out scanning according to the present embodiment, the storage part 65 only performs image processing and storage of the image data obtained by reading depending upon the type of device. For this reason, the image processing part 7 does not perform filter image processing on the image data formed by logged-out scanning. It is thereby possible to provide a user with original image data so that the user can perform image processing later.

In this way, the image processing part 7 of the multifunctional peripheral 100 according to the present embodiment does not perform predetermined types of image processing out of those type of image processing performed during normal scanning (i.e., not logged-out scanning) upon the image data obtained by logged-out scanning A user can thereby obtain easily reusable image data.

(Use of Image Data Obtained by Logged-Out Scanning)

Figure 11:
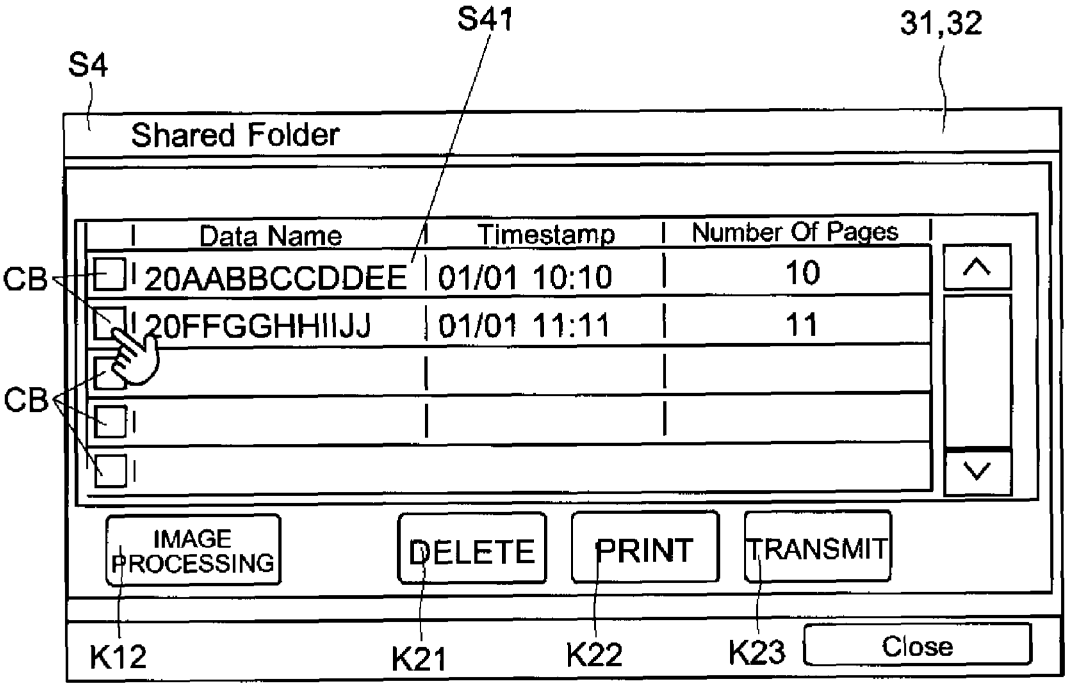
FIG. 11 is an illustration of one example of a shared folder screen.
Figure 12:
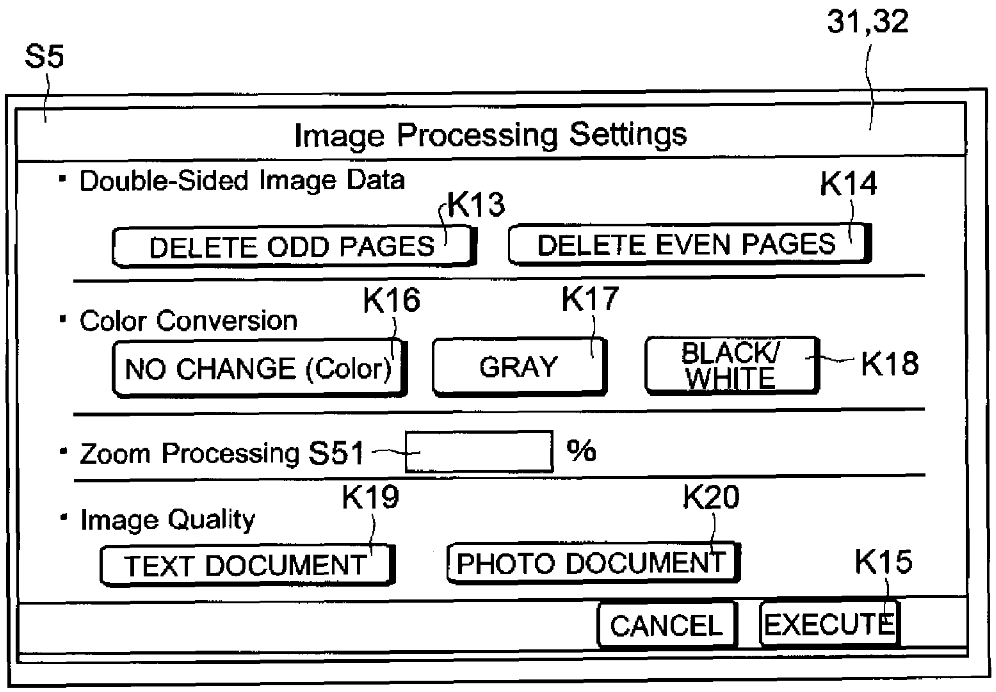
FIG. 12 is an illustration of one example of an image processing settings screen.

Next, the use of image data obtained by logged-out scanning using the multifunctional peripheral 100 according to the present embodiment will be described with reference to FIGS. 11 and 12. FIG. 11 is an illustration of one example of a shared folder screen S4. FIG. 12 is an illustration of one example of an image processing settings screen S5.

As described above, the storage part 65 (for instance, the HDD 64) of the multifunctional peripheral 100 is provided with a shared storage space (shared folder 66). Image data obtained by logged-out scanning using the multifunctional peripheral 100 according to the present embodiment is stored in the shared folder 66.

By accessing the shared folder 66 from an external computer 200 through the communication part 8 of the multifunctional peripheral 100, the computer 200 can download image data obtained by logged-out scanning. The user who performed logged-out scanning can thereby input the image data obtained by logged-out scanning into the user's own information processing device. In other words, inputting and setting operations, namely, setting the transmission address of the image reading device and transmitting the image data obtained by logged-out scanning to one's own information processing device, need not be performed on the image reading device. Thus, it is possible to reduce the amount of time spent engaging in inputting and settings operations in front of the image reading device, improving the utilization rate of the image reading device and increase office productivity.

The operation panel 3 can be operated to perform a job (printing or transmission) using the image data obtained by logged-out scanning For example, FIG. 11 shows one example of a shared folder screen S4 displayed on the operation panel 3 when the shared folder 66 is opened. The multifunctional peripheral 100 according to the present embodiment has a function of storing and accumulating image data obtained by the reading of the reading part 101 in the HDD 64 of the storage part 65 (box function). Part of the storage space of the HDD 64 of the storage part 65 is allocated for storing image data. Storage space for the shared folder 66 is provided in the HDD 64 as one type of storage space allocated for this box function.

When a user uses the image data stored in the shared folder 66, the user operates the operation panel 3 to display the shared folder screen S4. For example, the user presses a BOX key provided or displayed on the operation panel 3. The user then selects the shared folder 66 from a list of folders displayed on the LCD part 31. A shared folder screen S4 such as that displayed on FIG. 11 is thereby displayed.

The shared folder screen S4 is provided with a display list S41 for displaying a list of the image data stored in the shared folder 66. The display list S41 displays the names, timestamps, and the like for the data stored in the shared folder 66. In the case of logged-out scanning, a data name based on, for example, the time and date when the image data was scanned is automatically appended, and the data is stored in the storage part 65.

A checkbox CB is provided on a left-end portion of the display list S41. The user presses the checkbox CB to designate the image data being used. A plurality of keys for performing operations upon the data accumulated in the shared folder 66 is displayed on the lower part of the display list S41. For example, an IMAGE PROCESSING key K12 is provided as a key.

As described above, in the multifunctional peripheral 100 according to the present embodiment, both sides of a document are read by default during logged-out scanning. In logged-out scanning, image data upon which some types of image processing have not been performed is stored in the storage part 65.

Thus, the IMAGE PROCESSING key K12 is provided in the shared folder screen S4 according to the present embodiment so that a user can perform desired types of image processing out of those types of image processing that were not performed. For example, when the IMAGE PROCESSING key K12 is pressed, the display control part 30 causes the LCD part 31 to display the image processing settings screen S5, as shown in FIG. 12.

The image processing settings screen S5 is provided with a DELETE ODD PAGES key K13 and a DELETE EVEN PAGES key K14. The DELETE ODD PAGES key K13 is pressed in order to delete odd-numbered pages within the image data obtained by double-sided reading. The DELETE EVEN PAGES key K14 is pressed in order to delete even-numbered pages within the image data obtained by double-sided reading.

When an EXECUTE key K15 provided on the image processing settings screen S5 is pressed and the DELETE ODD PAGES key K13 or the DELETE EVEN PAGES key K14 has been pressed (selected), the display control part 30 notifies the main control part 6 of the name of the image data in question and the fact that the odd-numbered pages or even-numbered pages are to be deleted. Upon receiving this notification, the main control part 6 causes the image processing part 7 to delete the odd-numbered pages or even-numbered page from the image data in question. In other words, the operation part (operation panel 3) accepts input indicating that the pages from one side of the double-sided image data stored in the storage part 65 are to be deleted, and the image processing part 7 forms image data in which all of the pages from the side marked for deletion using the operation part have been deleted from the double-sides image data stored in the storage part 65. It is thereby possible to obtain image data in which only one side of a document has been read simply by designating one side of the image data obtained by double-sided reading of the document. Thus, single-sided image data can be obtained and a user-friendly image reading device provided without the need to perform complicated operations.

The image processing settings screen S5 is also provided with a NO CONVERSION key K16, a GRAY key K17, and a BLACK/WHITE key K18 for color conversion. The NO CONVERSION key K16 is pressed to keep the image data obtained by logged-out scanning as color data. The GRAY key K17 is pressed to convert the image data obtained by logged-out scanning to grayscale data. The BLACK/WHITE key K18 is pressed to convert the image data obtained by logged-out scanning to two-tone black-and-white data.

When the EXECUTE key K15 on the image processing settings screen S5 is pressed, the display control part 30 notifies the main control part 6 of the image data name and image data color format (color, grayscale, or two-tone black-and-white) of the data in question according to which of the NO CONVERSION key K16, the GRAY key K17, and the BLACK/WHITE key K18 has been pressed (selected). In response to this notification, the main control part 6 causes the image processing part 7 to convert the data in question when the data is to be converted to grayscale or two-tone black-and-white.

The image processing settings screen S5 is also provided with a zoom settings field S51 for performing zoom processing. When performing zoom processing, the user uses the ten key part 33 and the like to input the desired magnification rate.

When the EXECUTE key K15 of the image processing settings screen S5 is pressed and a magnification rate has been inputted in the zoom settings field S51, the display control part 30 notifies the main control part 6 of the name of the image data in question and the zoom processing magnification rate. In response to this notification, the main control part 6 causes the image processing part 7 to perform zoom processing upon the data in question.

The image processing settings screen S5 is also provided with a TEXT DOCUMENT key K19 and a PHOTO DOCUMENT key K20 for performing image processing according to the quality of the document. The TEXT DOCUMENT key K19 is pressed when the document read during logged-out scanning is a text document. The PHOTO DOCUMENT key K20 is pressed when the document read during logged-out scanning is a photo document.

When the EXECUTE key K15 on the image processing settings screen S5 is pressed, the display control part 30 notifies the main control part 6 of the image data name and image data document type of the data in question according to which of the TEXT DOCUMENT key K19 and the PHOTO DOCUMENT key K20 has been pressed (selected). In response to this notification, the main control part 6 causes the image processing part 7 to perform derivative filter (edge emphasizing) image processing on the color image data in the case of a text document. In response to this notification, the main control part 6 causes the image processing part 7 to perform integrating filter (smoothing) image processing on the color image data in the case of a photo document.

In this way, the user can perform desired types of image processing upon the image data obtained by logged-out scanning using the image processing settings screen S5, and work the image data into the state desired by the user. In other words, the operation part (operation panel 3) accepts instruction inputs for performing image processing including one or a plurality of color conversion to gray or two-tone black-and-white, zoom processing, and filter processing, and the image processing part 7 performs image processing upon the image data stored in the storage part 65 according to the instructions inputted into the operation part. A user can thereby perform image processing upon logged-out scanning data after performing logged-out scanning when, for example, nobody is using the image reading device (multifunctional peripheral 100).

As shown in FIG. 11, the shared folder screen S4 is provided with a DELETE key K21, a PRINT key K22, a TRANSMIT key K23, and the like.

The DELETE key K21 is pressed to delete the selected (checked) image data from the image data stored in the shared folder 66. When the DELETE key K21 is pressed, the display control part 30 notifies the main control part 6 that the checked image data is to be deleted from the storage part 65. In response to this notification, the main control part 6 deletes the checked image data from the storage part 65. Unnecessary image data can thereby be deleted from the shared folder 66.

The PRINT key K22 is pressed to print the image data selected (checked) from among the image data stored in the shared folder 66. When the PRINT key K22 is pressed, the display control part 30 displays, for example, a printing settings screen (not illustrated) or the like. When the START key 34 is pressed, for example, the display control part 30 notifies the main control part 6 that printing is to be performed on the basis of the checked image data, and notifies the main control part 6 of the printing settings. In response to this notification, the main control part 6 causes the engine control part 5*d* to perform printing on the basis of the checked image data. At this time, the image processing part 7 performs image processing upon the image data as necessary. It is thereby possible to perform printing based on the image data obtained by logged-out scanning.

The TRANSMIT key K23 is pressed to transmit the image data selected (checked) from among the image data stored in the shared folder 66. When the TRANSMIT key K23 is pressed, for example, the display control part 30 causes the LCD part 31 to display a screen (not illustrated) or the like for setting the transmission address (recipient). When the START key 34 is pressed, for example, the display control part 30 notifies the main control part 6 that transmission is to be performed on the basis of the checked image data, and notifies the main control part 6 of the transmission settings (for instance, the recipient address). In response to this notification, the main control part 6 causes image data to be transmitted from the communication part 8 on the basis of the checked image data. At this time, the image processing part 7 performs image processing upon the image data as necessary. It is thereby possible to perform image data transmission based on the image data obtained by logged-out scanning.

When the PRINT key K22 or TRANSMIT key K23 is pressed, the display control part 30 may also cause the LCD part 31 to display an image processing settings screen S5 such as that shown in FIG. 12. It is thereby possible for the user to set image processing settings for types of image processing not performed.

The image processing settings screen S5 such as that shown in FIG. 12 may also be displayed on the display of a computer 200 to which the logged-out scanning image data has been downloaded from the multifunctional peripheral 100. For example, an image processing program or image data for the image processing settings screen S5 may be included in the driver program for using the multifunctional peripheral 100. A configuration may also be adopted wherein image processing, such as deletion of odd-numbered or even-numbered pages, color conversion, zooming, and filter processing according to document picture quality, may be performed in the computer 200 in the same manner as in the multifunctional peripheral 100. Thus, the computer 200 (information processing device) and multifunctional peripheral 100 can be said to constitute an image reading system 400.

The foregoing was a description of embodiments according to the present disclosure, but the scope of the disclosure is not limited to these, and various modifications within the spirit of the disclosure may be made.

What is claimed is:

1. An image reading device comprising:

a reading part for reading a document, forming image data, and performing logged-out scanning, in which a document is read and image data is formed while the image reading device is in a logged-out state;

an operation part for accepting, in the logged-out state, no input other than input of identification information for identifying and certifying a user and input for execution and setting of the logged-out scanning, entering a logged-in state when the user is successfully certified, accepting a settings input and a function execution input entered in order to use a function of the image reading device in the logged-in state, and entering the logged-out state when a predetermined condition is met, the operation part including a scanning START key for accepting an instruction to perform scanning in the logged-out state, a double side key for making a setting to perform the logged-out scanning by reading both sides of a document, a single side key for making a setting to perform the logged-out scanning by reading only one side of a document, and a high resolution key and a low resolution key for specifying resolution in the logged-out scanning, default settings for the logged-out scanning being double-sided reading and high resolution;

a storage part including a shared space constituting a shared storage space, the storage part adapted for storing, in the shared space, image data formed by the logged-out scanning; and an image processing part for performing an image process on the image data, wherein the reading part has a double-sided reading mechanism for performing double-sided reading of a document, and uses, when reading both sides in the logged-out scanning, the double-sided reading mechanism to perform double-sided reading of a document and form double-sided image data of the document;

the storage part stores the formed double-sided document image data in the shared space;

the operation part accepts input for deleting a page of one side of the double-sided image data stored in the storage part; and the image processing part forms image data in which all of the pages from the side marked for deletion using the operation part have been deleted from the double-sided image data stored in the storage part.

2. The image reading device according to claim 1, further comprising:

a communication part for communicating with an external information processing device;

wherein:

the storage part accepts access to the image data stored in the shared space from the external information processing device through the communication part.

3. The image reading device according to claim 1, wherein:

when image data formed by logged-out scanning is stored in the storage part, the image processing part will not subject the image data to a predetermined type of image processing among a plurality of types of image processing carried out on image data formed by the reading part in the logged-in state, information being irreversible when the predetermined type of image processing is executed; and the storage part stores, in the shared space, image data not subjected to the predetermined type of image processing.

4. The image reading device according to claim 3, wherein:

the reading part forms color image data; and when image data formed by logged-out scanning is stored in the storage part, the image processing part does not perform image processing for converting the image data to gray or two-tone black-and-white image data.

5. The image reading device according to claim 3, wherein:

when image data formed by logged-out scanning is stored in the storage part, the image processing part does not subject the image data to zoom image processing.

6. The image reading device according to claim 3, wherein:

when image data formed by logged-out scanning is stored in the storage part, the image processing part does not subject the image data to image processing using a filter.

7. The image reading device according to claim 3, wherein:

the operation part accepts input of an instruction for performing image processing including one or a plurality of color conversion to gray or two-tone black-and-white, zoom processing, and filter processing; and the image processing part subjects the image data stored in the storage part to image processing according to an instruction inputted into the operation part.

8. A method for scanning in a logged-out state comprising the steps of:

performing logged-out scanning, in which a document is read and image data is formed while the logged-out state is in effect;

accepting, using an instruction to execute scanning in the logged-out state;

accepting, using an operation part, no input other than input of identification information for identifying and certifying a user in a logged-out state and input for execution and setting of the logged-out scanning;

causing the operation part to enter a logged-in state when the user is successfully certified;

accepting, using the operation part, settings input and function execution input entered in order to use a function of the image reading device in the logged-in state, causing the operation part to enter the logged-out state when a predetermined condition is met;

accepting, in the logged-out state, settings using a double side key for making a setting to perform the logged-out scanning by reading both sides of a document, a single side key for making a setting to perform the logged-out scanning by reading only one side of a document, and a high resolution key and a low resolution key for specifying resolution in the logged-out scanning, default settings for the logged-out scanning being double-sided reading and high resolution;

storing image data formed by the logged-out scanning in a shared space constituting shared storage space included in a storage part, wherein when both sides are read in the logged-out scanning, a double-sided reading mechanism for performing double-sided reading of a document is used to perform double-sided reading of a document and form double-sided image data of the document;

the formed double-sided document image data is stored in the shared space of the storage part;

input for deleting a page of one side of the double-sided image data stored in the storage part is accepted by the operation part; and image data is formed in which pages from the side marked for deletion using the operation part have been deleted from the double-sided image data stored in the storage part.

9. The method for scanning in a logged-out state according to claim 8, wherein:

access to the image data stored in the shared space from the external information processing device is accepted by the storage part through the communication part.

10. The method for scanning in a logged-out state according to claim 8, wherein when image data formed by logged-out scanning is stored in the storage part, the image data will not be subjected to a predetermined type of image processing among a plurality of types of image processing carried out on image data formed by the reading part in the logged-in state, information being irreversible when the predetermined type of image processing is executed; and image data not subjected to the predetermined type of image processing is stored in the shared space of the storage part.

11. The method for scanning in a logged-out state according to claim 10, wherein:

input of an instruction to perform image processing including one or a plurality of color conversion processing to gray or two-tone black-and-white, zoom processing, and filter processing is accepted by the operation part; and the image data stored in the storage part is subjected to image processing according to the instruction inputted into the operation part.

* * * * *